United States Patent [19]

Matsuura

[11] Patent Number: 4,646,225
[45] Date of Patent: Feb. 24, 1987

[54] ADAPTIVE FEED RATE CONTROLLER FOR TRACER HEAD

[75] Inventor: Hitoshi Matsuura, Hachioji, Japan

[73] Assignee: Fanuc Ltd, Minamitsuru, Japan

[21] Appl. No.: 673,747

[22] PCT Filed: Feb. 28, 1984

[86] PCT No.: PCT/JP84/00072
§ 371 Date: Nov. 5, 1984
§ 102(e) Date: Nov. 5, 1984

[87] PCT Pub. No.: WO84/03466
PCT Pub. Date: Sep. 13, 1984

[30] Foreign Application Priority Data

Mar. 4, 1983 [JP] Japan .................................. 58-35589

[51] Int. Cl.⁴ ...................... G05B 19/18; G05B 21/02; G05B 19/25; G05B 19/33
[52] U.S. Cl. .................................. 364/167; 364/474; 364/178; 318/636; 318/571; 318/578
[58] Field of Search ............... 364/167, 168, 174, 474, 364/578, 171, 178–179; 318/567, 568, 570, 571, 578, 636

[56] References Cited

U.S. PATENT DOCUMENTS

| 3,777,128 | 12/1973 | Kirkham | 364/178 |
| 4,224,670 | 9/1980 | Yamazaki | 364/474 |
| 4,232,364 | 11/1980 | Bibbero | 364/178 |
| 4,370,722 | 1/1983 | Imazeki et al. | 364/474 |
| 4,394,608 | 11/1983 | Tryber | 318/578 |
| 4,412,295 | 10/1983 | Imazeki et al. | 364/474 |
| 4,424,570 | 1/1984 | Imazeki et al. | 364/474 |
| 4,456,962 | 6/1984 | Imazeki et al. | 364/474 |
| 4,534,685 | 8/1985 | Komiya | 364/474 |
| 4,543,625 | 9/1985 | Nozawa | 364/174 |
| 4,554,497 | 11/1985 | Nozawa et al. | 318/636 |
| 4,571,686 | 2/1986 | Torisawa | 318/567 |
| 4,603,285 | 7/1985 | Matsuura et al. | 318/578 |

Primary Examiner—Jerry Smith
Assistant Examiner—Jon D. Grossman
Attorney, Agent, or Firm—Staas & Halsey

[57] ABSTRACT

The present invention is intended to prevent a cutter from biting into a workpiece at a point of a sudden change in the configuration of a model in tracer control equipment. Sampling circuits (12, 12X to 12Z) respectively sample a composite displacement signal and displacement signals in the X-axis to Z-axis directions at equal time intervals. An arithmetic circuit (17) obtains the angle between the displacement vector of a stylus (1) at the current sampling and the displacement vector of the stylus (1) at the previous sampling from the sample values by the sampling circuits (12, 12X to 12Z). A comparator (18) compares the result of calculation by the arithmetic circuit (17) and a reference level and, according to the result of comparison, controls whether to decrease the feed rate. Accordingly, the cutter can be prevented from biting into the workpiece at the sudden-change point in the configuration of a model.

6 Claims, 2 Drawing Figures

ADAPTIVE FEED RATE CONTROLLER FOR TRACER HEAD

BACKGROUND OF THE PRESENT INVENTION

The present invention relates to improvement in tracer control equipment which performs tracer control in response to a displacement signal from a tracer head tracing the surface of a model, and more particularly to tracer control equipment which is capable of preventing a cutter from biting into a workpiece at a point of a sudden change in the configuration of the model such as a corner portion or the like.

In tracing, when a point of sudden change in the configuration of a model, such as a corner or the like, is traced at the same tracing speed as that for other portions, a cutter can bite into a workpiece, which results in lower cutting accuracy. It is a general practice in the prior art to attach a potential wire to a model made of an insulating material in the vicinity of a sudden-change point in the configuration of the model so that when a metallic stylus makes contact with the potential wire, a closed circuit is formed and deceleration control is performed, preventing a reduction of the cutting accuracy at the sudden-change point in the model configuration.

However, the above prior art example has the following defects caused by the necessity of attaching the potential wire to the model.

(1) Since the potential wire has a thickness, the model surface to which the potential wire is attached cannot be traced accurately.

(2) Attaching the potential wire on the model introduces the possibility that the model will be damaged.

(3) Inaccurate deceleration control can result due to bad contact.

Besides this, there has been proposed control equipment of the type in which data representing a deceleration region is prestored in a memory and the deceleration control is performed on the basis of the data and the results of position detection by position sensors in the X-, Y- and Z-axis directions. However, this control equipment calls for prestoring new data indicating the deceleration region in the memory for each of plural models of different configurations, and hence has the defect of involving cumbersome operations.

SUMMARY OF THE INVENTION

The present invention has been made from such a point of view, and has as an object allowing ease in performing the deceleration control at the sudden-change point in the model configuration. According to the present invention, displacement signals from the tracer head and a composite displacement signal are sampled at regular time intervals, the angle between displacement vectors of the stylus at the current and the previous sampling is calculated on the basis of the current and the previous sample value and, on the basis of the result of calculation, control is provided as to whether the feed rate is to be decreased or not.

DESCRIPTION OF PREFERRED EMBODIMENTS

Figure 1:
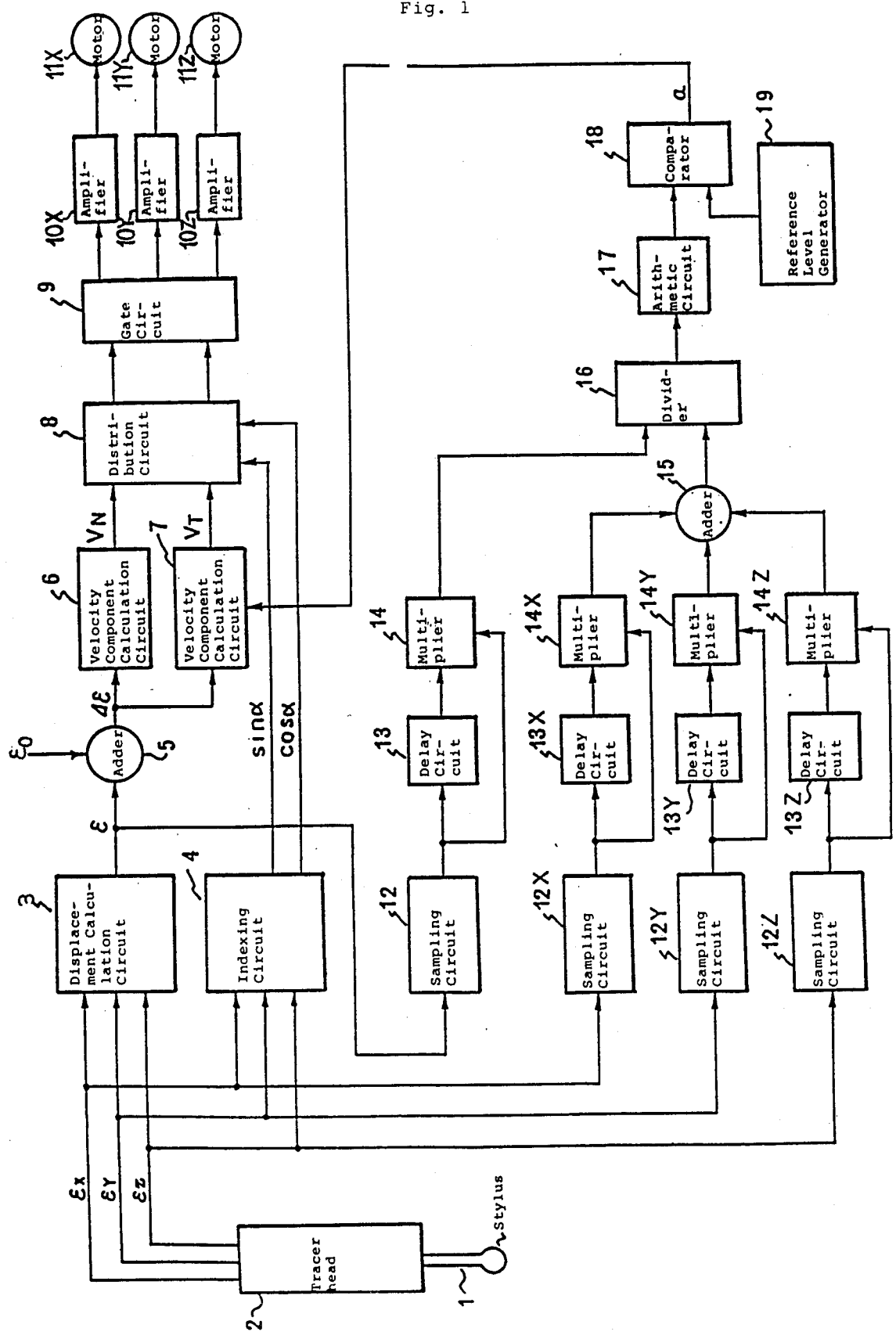
FIG. 1 is a block diagram of an embodiment of the present invention.

FIG. 1 is a block diagram of an embodiment of the present invention, in which 1 is a stylus, 2 a tracer head, 3 a displacement calculation circuit, 4 an indexing circuit, 5 an adder, 6 and 7 velocity component calculation circuits, 8 a distribution circuit, 9 a gate circuit, 10X to 10Z amplifiers, 11X to 11Z motors for moving a workpiece and a model relative to each other in the X-, Y- and Z-axis directions, 12 and 12X to 12Z sampling circuits, 13 and 13X to 13Z delay circuits, 14 and 14X to 14Z multipliers, 15 an adder, 16 a divider, 17 an arithmetic circuit, 18 a comparator and 19 a reference level generator.

The stylus 1 is brought into contact with the model and fed by the motors, and displacement signals $\epsilon_x$, $\epsilon_y$ and $\epsilon_z$ corresponding to the displacement of the stylus 1 are provided from the tracer head 2. Based on the displacement signals $\epsilon_x$, $\epsilon_y$ and $\epsilon_z$, The displacement calculation circuit 3 produces a composite displacement signal $\epsilon = \sqrt{\epsilon_x^2 + \epsilon_y^2 + \epsilon_z^2}$ and the indexing circuit 4 produces displacement-direction signals $\sin \alpha$ and $\cos \alpha$. The composite displacement signal $\epsilon$ is applied to the adder 5, wherein a difference $\Delta\epsilon$ between it and a reference displacement signal $\epsilon_0$ is obtained. In the velocity calculation circuits 6 and 7 normal velocity $V_N$ and tangential velocity $V_T$ are obtained. In the distribution circuit 8 a velocity command signal is produced based on the displacement-direction signals $\sin \alpha$ and $\cos \alpha$, and the velocity command signal is provided to the servo amplifier selected by the gate circuit 9. The resulting amplified output drives the corresponding motor, bodily feeding a cutter (not shown) and the stylus 1. Since the above-described operation is well-known, no further detailed description thereof will be given.

The sampling circuits 12 and 12X to 12Z respectively sample the composite displacement signal $\epsilon$ and the displacement signals $\epsilon_x$, $\epsilon_y$ and $\epsilon_z$ in the X-, Y- and Z-axis directions at equal time intervals t and supply the sample values to the delay circuits 13 and 13X to 13Z and the multiplication circuits 14 and 14X to 14Z. The delay circuits 13 and 13X to 13Z respectively delay the sample values from the sampling circuits 12 and 12X to 12Z by one sample time (the time t) and provide the delayed outputs to the multipliers 14 and 14X to 14Z, respectively. Accordingly, the multiplier 14 multiplies current and previous sample values $\epsilon_N$ and $\epsilon_{N-1}$ of the composite displacement signal $\epsilon$, and the multipliers 14X to 14Z multiply current sample values $\epsilon_{XN}$, $\epsilon_{YN}$ and $\epsilon_{ZN}$ and previous sample values $\epsilon_{X(N-1)}$, $\epsilon_{Y(N-1)}$ and $\epsilon_{Z(N-1)}$ of the displacement signals $\epsilon_x$, $\epsilon_y$ and $\epsilon_z$ in the X-, Y- and Z-axis directions, respectively. The adder 15 performs a calculation expressed by the following expression (1), adding together the results of multiplication by the multipliers 14X to 14Z.

$$\epsilon_{XN} \cdot \epsilon_{X(N-1)} + \epsilon_{YN} \cdot \epsilon_{Y(N-1)} + \epsilon_{ZN} \cdot \epsilon_{Z(N-1)} \tag{1}$$

The divider 16 performs a calculation expressed by the following expression (2) on the basis of the result of addition by the adder 15 expressed by the expression (1) and the result of multiplication by the multiplier 14 and provides the result of division to the arithmetic circuit 17.

$$\frac{\epsilon_{XN} \cdot \epsilon_{X(N-1)} + \epsilon_{YN} \cdot \epsilon_{Y(N-1)} + \epsilon_{ZN} \cdot \epsilon_{Z(N-1)}}{\epsilon_N \cdot \epsilon_{N-1}} \quad (2)$$

Figure 2:
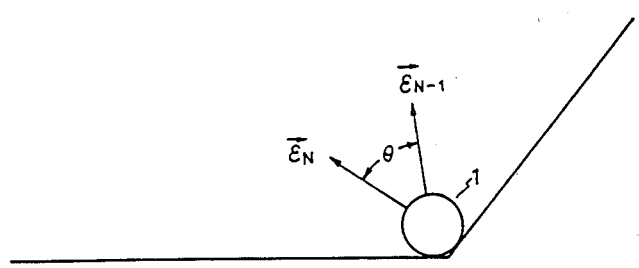
FIG. 2 is a vector diagram showing the direction of displacement of the stylus.

Incidentally, assuming that the displacement vector of the stylus 1 at the current sampling and displacement vector of the stylus 1 at the previous sampling are $\vec{\epsilon}_N$ and $\vec{\epsilon}_{N-1}$, respectively, as shown in FIG. 2, the current sample value $\epsilon_N$ of the composite displacement, which is output from the sampling circuit 12, corresponds to the magnitude ($|\vec{\epsilon}_N|$) of the displacement vector $\vec{\epsilon}_N$, and the previous sample value $\epsilon_{N-1}$ of the composite displacement, which is provided from the delay circuit 13, corresponds to the magnitude ($|\vec{\epsilon}_{N-1}|$) of the displacement vector $\vec{\epsilon}_{N-1}$. The current sample values $\epsilon_{XN}$, $\epsilon_{YN}$ and $\epsilon_{ZN}$ from the sampling circuits 12X to 12Z correspond to the X, Y and Z components of the displacement vector $\vec{\epsilon}_N$, respectively, and the previous sample values $\epsilon_{X(N-1)}$, $\epsilon_{Y(N-1)}$ and $\epsilon_{Z(N-1)}$ from the delay circuits 13X to 13Y correspond to the X, Y and Z components of the displacement vector $\vec{\epsilon}_{N-1}$, respectively. Accordingly, the inner product of the displacement vectors $\vec{\epsilon}_N$ and $\vec{\epsilon}_{N-1}$ can be given by the following expression (3):

$$\begin{aligned}\vec{\epsilon}_N \cdot \vec{\epsilon}_{N-1} &= \epsilon_N \cdot \epsilon_{N-1} \cos\theta \\ &= \epsilon_{XN} \cdot \epsilon_{X(N-1)} + \epsilon_{YN} \cdot \epsilon_{Y(N-1)} + \epsilon_{ZN} \cdot \epsilon_{Z(N-1)}\end{aligned} \quad (3)$$

where $\theta$ is the angle between the displacement vectors $\vec{\epsilon}_N$ and $\vec{\epsilon}_{N-1}$.

By modifying the expression (3) the following expression (4) can be obtained.

$$\cos\theta = \frac{\epsilon_{XN} \cdot \epsilon_{X(N-1)} + \epsilon_{YN} \cdot \epsilon_{Y(N-1)} + \epsilon_{ZN} \cdot \epsilon_{Z(N-1)}}{\epsilon_N \cdot \epsilon_{N-1}}$$

Accordingly, as will be seen from comparison of the expressions (2) and (4), the result of division by the divider 16 represents the cosine $\cos\theta$ of the angle $\theta$ between the displacement vectors $\vec{\epsilon}_N$ and $\vec{\epsilon}_{N-1}$.

Based on the result of division by the divider 16, the arithmetic circuit 17 performs a calculation expressed by the following expression (5), obtaining the angle $\theta$ between the displacement vectors $\epsilon_N$ and $\epsilon_{N-1}$.

$$\theta = \cos^{-1}\left(\frac{\epsilon_{XN} \cdot \epsilon_{X(N-1)} + \epsilon_{YN} \cdot \epsilon_{Y(N-1)} + \epsilon_{ZN} \cdot \epsilon_{Z(N-1)}}{\epsilon_N \cdot \epsilon_{N-1}}\right) \quad (5)$$

The comparator 18 compares the result of calculation by the arithmetic circuit 17 and the reference level from the reference level generator 19 and, when the result of calculation is larger than the reference level, makes a deceleration command signal a "1", decreasing the feed rate. That is, in the event that the angle $\theta$ between the displacement vector $\vec{\epsilon}_N$ of the stylus at the current sampling and the displacement vector $\vec{\epsilon}_{N-1}$ of the stylus at the previous sampling exceeds a certain value, it is judged to represent a sudden-change point in the configuration of the model and the deceleration command signal a is made a "1", reducing the feed rate.

While the embodiment has been described to determine whether the feed rate is decreased, depending upon the result of calculation by the arithmetic circuit 17, it is also possible, of course, to determine whether to effect the deceleration control, depending upon the amount of variation in the result of calculation per unit time.

As described above, since the present invention is provided with the sampling circuits for sampling displacement signals in the X-, Y- and Z-axis directions and a composite displacement signal, respectively, calculating means comprised of the delay circuits 13 and 13X to 13Z, the multipliers 14 and 14X to 14Z, the adder 15, the divider 16 and the arithmetic circuit 17, for calculating the angle between displacement vectors of the stylus at the current and the previous sampling on the basis of the sample values available from the sampling circuits, and control means made up of the comparator 16 and the reference level generator 19, for controlling whether to decrease the feed rate, depending upon the result of calculation by the calculating means, the invention possesses the advantage of facilitating deceleration control at a sudden-change point in the configuration of a model, such as a corner portion or the like.

I claim:

1. Tracer control equipment which performs tracer control according to displacement signals $\epsilon_x$, $\epsilon_y$, and $\epsilon_z$ in the X-, Y- and Z-axis directions which are provided from a tracer head having a stylus for tracing the surface of a model, for correspondingly shaping a workpiece, comprising
   sampling circuits for sampling the displacement signals $\epsilon_x$, $\epsilon_y$ and $\epsilon_z$ and a composite displacement signal $\sqrt{\epsilon_x^2 + \epsilon_y^2 + \epsilon_z^2}$, respectively, at regular time intervals during tracing of said surface of said model by said stylus, and for providing respective outputs,
   calculating means for receiving said outputs of said sampling circuits and for calculating a value corresponding to the angle between displacement vectors of the stylus at the current and the previous sampling of said sampling circuits, based on the current and previous values of said outputs of the sampling circuits, and for providing a corresponding output, and
   control means for receiving said output of said calculating means and for controlling whether a feed rate of the tracer head with respect to the workpiece is decreased, depending upon said output from the calculating means.

2. The equipment of claim 1, said control means comprising a reference level generator for outputting a reference level and a comparator for comparing said output of said calculating means corresponding to said angle with said reference level, wherein said control means decreases said feed rate when said value corresponding to said angle is greater than said reference level during said tracing.

3. The equipment of claim 2, said calculating means comprising a divider whose input corresponds to outputs of said sampling circuits outputting a signal corresponding to the cosine of said angle, and an arithmetic circuit which receives as an input said output of the divider and outputs said value corresponding to said angle to said comparator.

4. The equipment of claim 2, wherein said control means operates so that a component of said feed rate of the tracer head with respect to the workpiece that is tangential to said surface being traced by said stylus is decreased, when said output of the calculating means exceeds a predetermined value.

5. The equipment of claim 1, wherein said controlling by said control means is on the basis of rate of change in said output of said calculating means corresponding to successive samplings of said sampling circuit.

6. The equipment of claim 1, wherein said control means operates so that a component of said feed rate of the tracer head with respect to the workpiece that is tangential to said surface being traced by said stylus is decreased, when said output of the calculating means exceeds a predetermined value.

* * * * *